Figure 1:
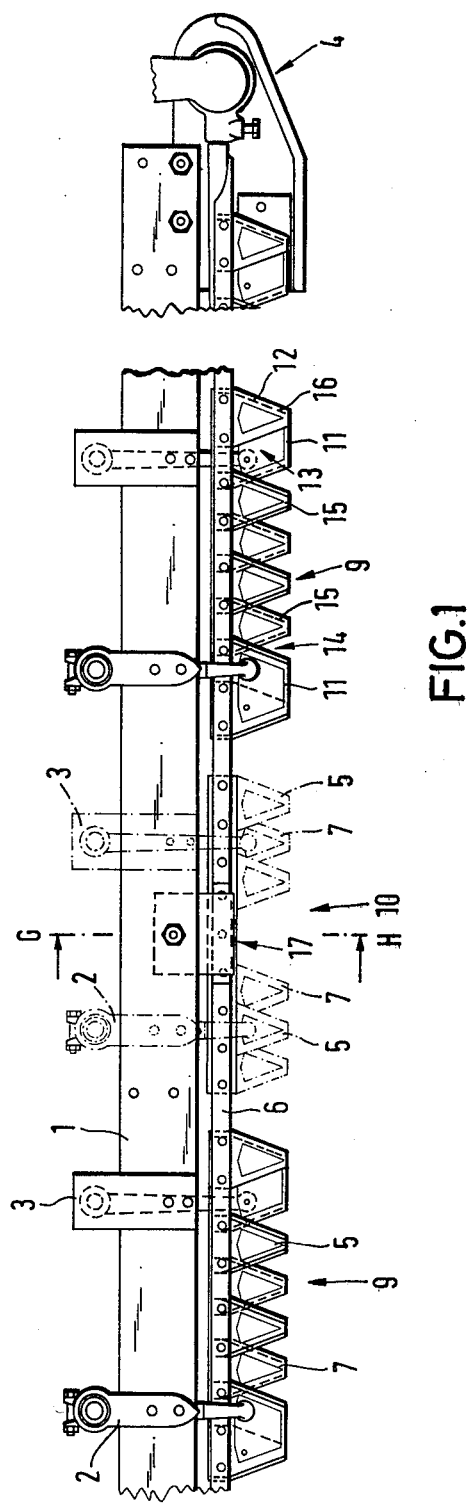

United States Patent [19]

Schneider et al.

[11] 4,267,689

[45] May 19, 1981

[54] MAIZE CUTTER

[75] Inventors: Rudolf Schneider; Wilhelm Schefers, both of Remscheid, Fed. Rep. of Germany

[73] Assignee: Busatis-Werke KG, Remscheid, Fed. Rep. of Germany

[21] Appl. No.: 53,326

[22] Filed: Jun. 29, 1979

[30] Foreign Application Priority Data

Jun. 30, 1978 [DE] Fed. Rep. of Germany ....... 2828766

[51] Int. Cl.³ .............................................. A07D 45/02
[52] U.S. Cl. .......................................... 56/53; 56/297; 56/275
[58] Field of Search ................... 56/251, 257, 225, 53, 56/DIG. 17, 296, 297

[56] References Cited

U.S. PATENT DOCUMENTS

| 994,184 | 6/1911 | Moody | 56/257 |
|---|---|---|---|
| 1,635,050 | 7/1927 | McKellar | 56/275 |
| 1,644,962 | 10/1927 | Swickard | 56/275 |
| 1,649,002 | 11/1927 | Swickard | 56/275 |

Primary Examiner—Robert A. Hafer
Attorney, Agent, or Firm—Friedman, Goodman & Teitelbaum

[57] ABSTRACT

A cutting mechanism for a maize cutter having several divider plates and at least one outside deflector for directing cornstalks into the maize cutter; the maize cutter also having entry chains or entry bands disposed between the divider plates and also between the divider plates and the outside deflector for holding the cornstalks fast and feeding the cornstalks to the cutting mechanism. The cutting mechanism is a double cutter including upper sets of cutter blades and co-acting associated lower sets of cutter blades, with each of the upper and associated lower cutter blades being arranged in a column. The upper and associated lower sets of cutter blades are laterally spaced from each other to define bladeless sections therebetween. The sets of cutter blades are disposed between the divider plates and also between the divider plates and the outside deflector, respectively, with the bladeless sections being disposed under the divider plates.

14 Claims, 4 Drawing Figures

MAIZE CUTTER

A maize cutter serves for the cutting of cornstalks that are processed in a chopper engaged on outlet side. It consists of several movable points arranged adjacently with flatly rising torpedo dividers or divider plates and mostly two outside deflectors. Between the divider plates and also between the divider plates and outside deflectors, respectively, there are entry chains and sprocket wheels or entry bands which serve essentially the purpose of holding the cornstalks fast and feeding them, after the cutting, to the chopper as disclosed in German printed specification No. 1407716 having a publication date of Mar. 13, 1969.

In known maize cutters the cutting mechanism consists mostly of rotating special cutters. Such a cutting mechanism permits, to be sure, high working speeds, but is highly subject to fouling and breakdown. There are known, further, single-cutter cutting mechanisms and fingerless cutting mechanisms, which, however, make possible only low working performances and, moreover, are likewise highly subject to breakdown.

The problem of the invention is to provide a maize cutter that operates sturdily and not subject to breakdown and ensures a high working performance.

This problem is solved according to the invention by a maize cutter which consists essentially of several divider plates and at least one outside deflector as well as a cutting mechanism and between the divider plates and also between the divider plates and outside deflectors, respectively, presents entry chains or bands and is distinguished in that the cutting mechanisms is a double-cutter cutting mechanism. According to the invention there are provided an upper and lower cutter each with cutter plates fastened to them in column manner, the blade columns being between the divider plates and between the divider plates and the outside deflectors, respectively, and the gaps or bladeless sections of the cutters being between the columns under the divider plates. In an advantageous manner the bladeless sections are used for the arrangement of fixed slide guides or for the arrangement of co-oscillating blade guides. Further, in the maize cutter of the invention it is especially advantageous that the cutter guide arms of the lower cutters are executed to hinge downward.

The maize cutter according to the invention can be produced in any desired width and presents—due to the cutting mechanism—a very high working performance. It is, like all double-cutter cutting mechanisms, extremely sturdy and maintenance-free.

With the aid of the drawing the invention is explained in detailed by way of an example, in which, in the interest of better perspicuity, only the new cutting mechanisms of the maize cutter is represented.

Figure 2:
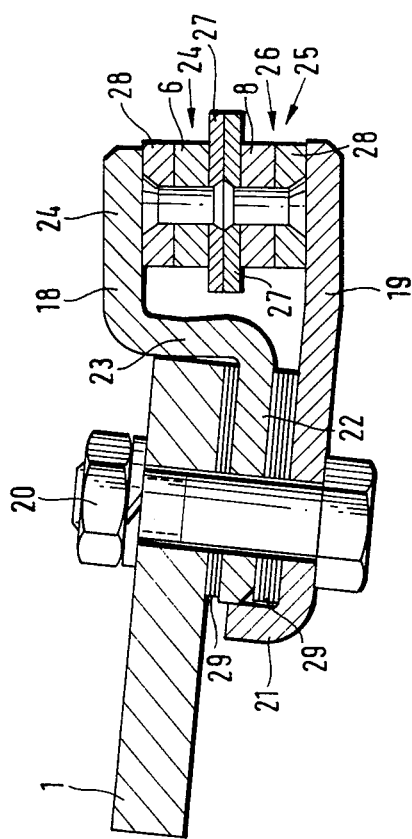
Figure 3:
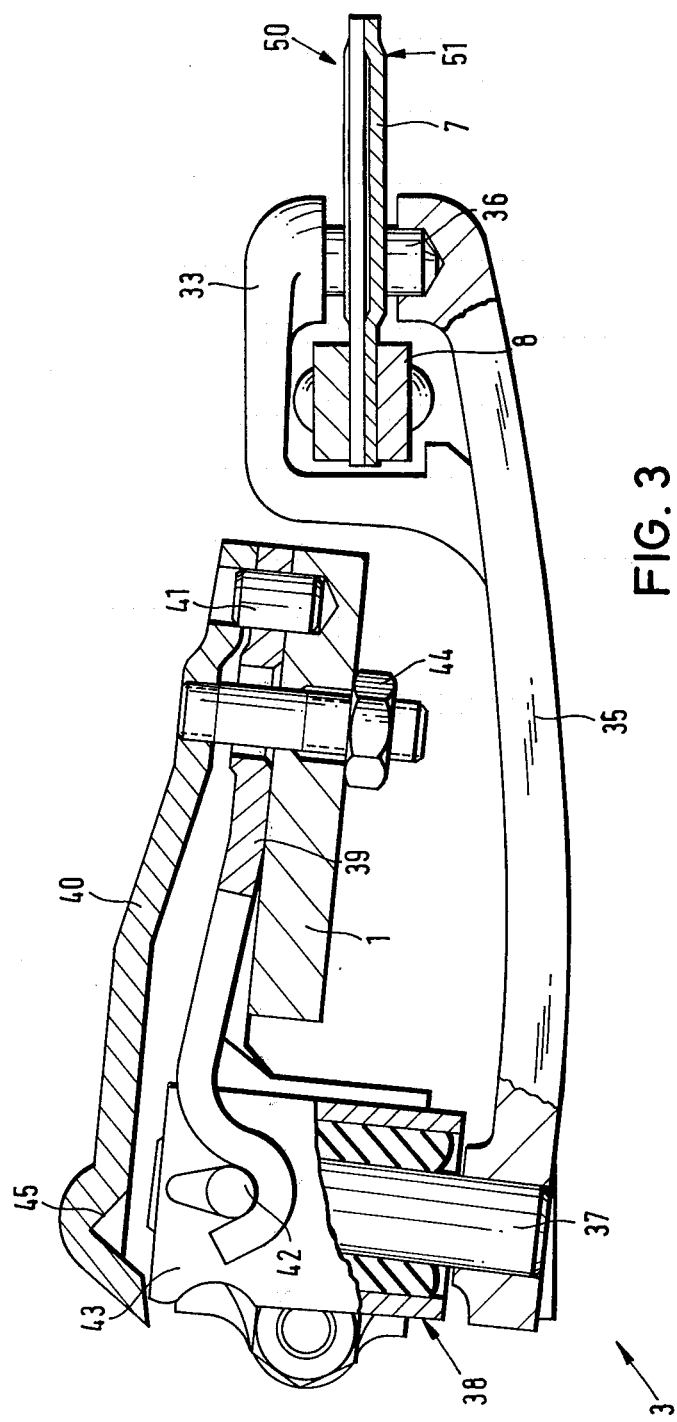
Figure 4:
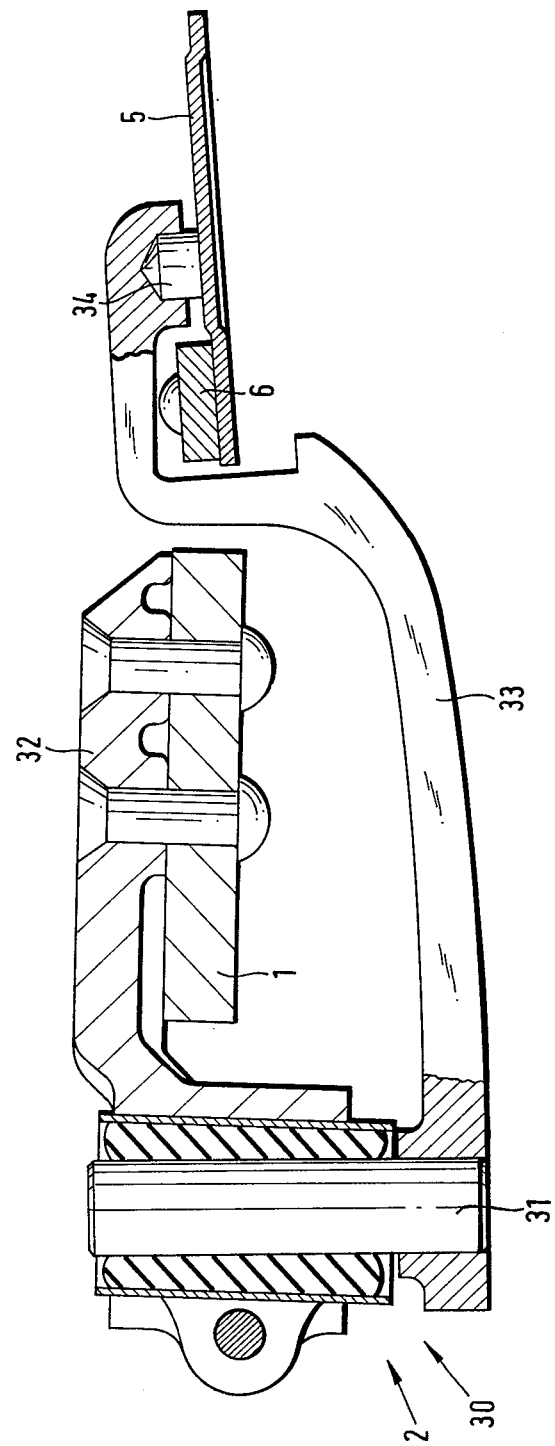

FIG. 1 shows a plan view of the new maize cutting mechanism;

FIG. 2 the fixed slide guide in the cutterless sections in the section along G-H in FIG. 1;

FIG. 3 a section through the lower cutter guide;

FIG. 4 a section through the upper cutter guide.

The new installation cutting mechanism for a maize cutting mechanism consists of the beam back 1, the upper cutter guide arms 2, the lower cutter guide arms 3, the upper cutter 50 and the lower cutter 51 as well as the lateral drive elements 4, known per se, which are not explained in detail.

The upper cutter guide arms 2 hold the upper cutter 50, and the lower cutter guide arms 3 hold the lower cutter 51, in a certain position with respect to the beam back 1, and, namely, both in elevation and also in spacing thereto.

The cutter blades 5 and 7 are, as represented, arranged in column manner on the cutter backs 6 and 8 and fastened to them in a manner known per se, in which arrangement in each grouping or set 9 preferably four upper cutter blades interact with four lower cutter blades and the width of the gaps or bladeless sections 10 of the cutting mechanism corresponds about to the width of each column of blades, the gap width being greater than the lateral spacing between the cutter blades in each set 9.

According to the invention the cutter holders 2 and 3 are preferably arranged on column-end side in lateral spacing from one another, in which arrangement, as represented, the upper cutter holder 2, for example in traveling direction is to the right and the lower cutter holder 3 is to the left side of the set 9 or vice versa. It is essential that the cutter holders 2 and 3 are joined swingably with end blades 11, which are constructed in trapezoidal form and are of such a width that they cover the outer counter-blade 12 laminarly and form in the gap 13 between two adjacent blades 15, 16 the usual shearing angle 14 with the adjacent counter-blade 15. This form of execution of the end blades 11 prevents in the interaction with the diagonal lateral arrangement of the cutter holders 2 and 3 to one another a premature wearing out of the end-side cutter blades.

According to an advantageous form of execution of the invention in the bladeless sections 10 of the cutting mechanism there is provided a slide guide 17 arranged in fixed position on the beam back 1, which guide is represented in section in FIG. 2. It consists of an upper slide guide plate 18 and a lower slide guide plate 19, which are fastened with a clamping screw 20 under the beam back 1, the lower slide guide plate 19 running substantially horizontal and presenting a rear support flange 21, which abuts against the lower end edge of the upper slide guide plate 18. The upper slide guide plate 18, however, presents a horizontally running clamping flange 22, upon which there follows a support flange 23 running about at a right angle upward, which abuts against the beam back 1 and goes over into an approximately horizontally running slide flange 24. The guide plates 18 and 19 guide in the slide zone 25 the cutterless cutter backs 6 and 8 which are riveted in the zone of the gaps 10 with slide elements 26. These slide elements 26 consist of an inside-arranged intermediate plate 27 each as cutter replacement, which presents the thickness of a cutter blade, and an outside-arranged slide plate 28 each. The slide elements are wear parts, the wear on which can be compensated by adding spacer plates 29 in the zone of the clamping screw. The spacer elements 29 serve, however, likewise in an advantageous manner for the adjustment of the cutter height position to the beam back 1.

Instead of the fixed slide guide 17 or in addition to this, depending on the type of maize to be cut, there can be arranged in the bladeless interspaces of the cutters in each case an upper cutter guide arm 2 and a lower cutter guide arm 3. For this it is required that instead of the intermediate plates 27 for the upper cutting guide arm 2 on the lower cutter 51, for example, there are arranged two cutter blades 7 and above them on the upper cutter 50 a cutter blade 5, on which there is arranged the pivot pin 36. For the lower cutter guide arm 3 there is to be provided the same blade combination, but reversed. It is also possible to construct the intermediate plates 27 wider or projecting and in each case to provide at one end a pivot pin 34, 36, onto which there can be slipped the head ends of the carrying arms 33, 35.

According to the invention the upper cutter holders 2 are arranged to swing only laterally, while the lower cutter holders 3 are constructed to swing laterally and to hinge downward. This principle is opposite to the state of the art; for as a rule the upper cutter holders are arranged to hinge downward. According to the invention the reversal of this principle offers in an advantageous manner, after the swinging up of the maize cutter, the accessibility of the cutting mechanism elements.

The fastening and holding elements of the cutter holders are in themselves thoroughly well known. The upper cutter holder 2, which is ordinarily used as lower cutter holder, consists of the known bearing 30 with pivot pin 31, which is connected with the cutter beam 1 over the bearing arm 32. On the bearing pivot pin 31 there is seated, laterally swingably, the cropped carrying arm 33, which is laterally swingable with the upper cutter 5 over the pivot pin 34.

The lower cutter holder 3 (FIG. 3) which is ordinarily used as upper cutter holder, likewise consists of elements in themselves known. It presents the carrying arm 35 which is seated on head side laterally swingable on the lower cutter 7 and detachably on the pivot pin 36. On end side the carrying arm 35 is borne on the bearing pin 37 of the bearing 38, which, again in a manner known per se, swingably in a vertical plane, is connected with the lower spring 39 and an upper spring 40, the lower spring 39 being seated with a fitting pin 41 on the beam back 1 and engaging with the fork-shaped end under two cams 42 of the bearing casing 43. The upper spring 40 is fastened with the clamping screw 44 to the beam back 1 and drawn elastically on end side against the bearing casing 43, the engagement point of the upper spring lying behind the cam 42. In the hinging down of the lower cutter holder the bearing 38 swings about the cam 42 until the bearing casing upper edge strikes against the inner edge 45 of the upper spring 40. Since this hinging-down principle is generally well known, it is unnecessary to go into it in detail.

We claim:

1. In a maize cutter having several divider plates and at least one outside deflector for directing cornstalks into the maize cutter; and also having at least one of entry chains, entry bands and the like disposed between the divider plates and also between the divider plates and the outside deflector for holding the cornstalks fast and feeding the cornstalks to a cutting mechanism; an improvement comprising:
   said cutting mechanism including double cutter means for cutting the cornstalks, said double cutter means including upper sets of cutter blades and co-acting associated lower sets of cutter blades;
   each of said upper and associated lower cutter blades being arranged in a column;
   said cutter blades in each set being spaced apart a selected distance;
   said upper and associated lower sets of cutter blades being laterally spaced from each other to provide bladeless sections therebetween, said bladeless sections being wider than said selected distance between said cutter blades; and
   said sets of cutter blades being disposed between the divider plates and also between the divider plates and the outside deflector, respectively, with said bladeless sections being disposed under the divider plates.

2. A maize cutter according to claim 1, wherein said cutting mechanism includes fixed slide guides for receiving and guiding said bladeless sections.

3. A maize cutter according to claim 1, wherein said cutting mechanism includes an upper cutter guide arm associated with each upper set of cutter blades for movement thereof, and a lower cutter guide arm associated with each lower set of cutter blades for movement thereof, said upper and lower cutter guide arms of each set being laterally spaced from each other with said upper cutter guide arm being disposed on one lateral side of each set and said lower cutter guide arm being disposed on the other lateral side of each set.

4. A maize cutter according to claim 3, wherein each said lower cutter guide arm includes means to permit said lower cutter guide arm to hinge downwardly with respect to each associated upper cutter guide arm.

5. A maize cutter according to claim 3, wherein each of said upper and lower cutter guide arms includes means swingably connecting said upper and lower cutter guide arms to end cutter blades of each set, each of said end cutter blades have a trapezoidal construction and extending over an associated outer counter-cutter blade of each set, a shearing angle being provided between adjacent upper cutter blades and associated adjacent lower counter-cutter blades in each set of upper and lower cutter blades.

6. A maize cutter according to claim 2, wherein said cutting mechanism includes a beam back for supporting said double cutter means, said slide guides being disposed on said beam back in a fixed position, each said slide guide including upper and lower slide guide plates, a clamping screw securing said upper and lower slide guide plates to said beam back, said lower slide guide plate extending substantially horizontal and including a rear support flange for abutting against a lower end edge of said upper slide guide plate, said upper slide guide plate including a horizontally extending clamping flange connected to an upwardly extending support flange which is connected to a horizontally extending slide flange, said bladeless sections being disposed between said lower slide guide plate and said slide flange of said upper slide guide plate.

7. A maize cutter according to claim 6, wherein each bladeless section of said upper and lower sets is riveted to slide elements.

8. A maize cutter according to claim 7, wherein said slide elements include an inside-arranged intermediate plate having a thickness of one said cutter blade, and an outside-arranged slide plate, said bladeless section being sandwiched between said inside and outside plates.

9. A maize cutter according to claim 6, wherein said upper and lower slide guide plates are secured below said beam back with spacer plates disposed on said clamping screw between said upper and lower slide guide plates.

10. A maize cutter according to claim 3, wherein said cutting mechanism includes a beam back for supporting said double cutter means, said upper cutter guide arm including a bearing arm connected to said beam back, said bearing arm including a bearing for receiving a pivot pin of a cropped carrying arm for laterally swinging of the carrying arm, said carrying arm including a second pivot pin for laterally swingable connection to one of said upper cutter blades.

11. A maize cutter according to claim 3, wherein said cutting mechanism includes a beam back for supporting said double cutter means, said lower cutter guide arm including a carrying arm provided with a pivot pin for laterally swingable, detachable connection to one of said lower cutter blades, said carrying arm including a bearing pin being received in a bearing, an upper and lower spring connecting said bearing to said beam back for swinging of said bearing in a vertical plane.

12. A maize cutter according to claim 11, wherein said lower spring is seated on said beam back with a fitting pin, said lower spring having a fork-shaped end engaged under two cams provided on said bearing, a clamping screw securing said upper spring to said beam back to elastically draw one end side of said upper spring toward said bearing, said upper spring engaging said bearing rearwardly of said two cams with respect to said beam back.

13. A maize cutter according to claim 2, wherein an upper cutter guide arm and a lower cutter guide arm are positioned in said bladeless sections together with said slide guides for guiding said bladeless sections.

14. A maize cutter according to claim 1, wherein an upper cutter guide arm and a lower cutter guide arm are positioned in said bladeless sections for guiding said bladeless sections.

* * * * *